UNITED STATES PATENT OFFICE.

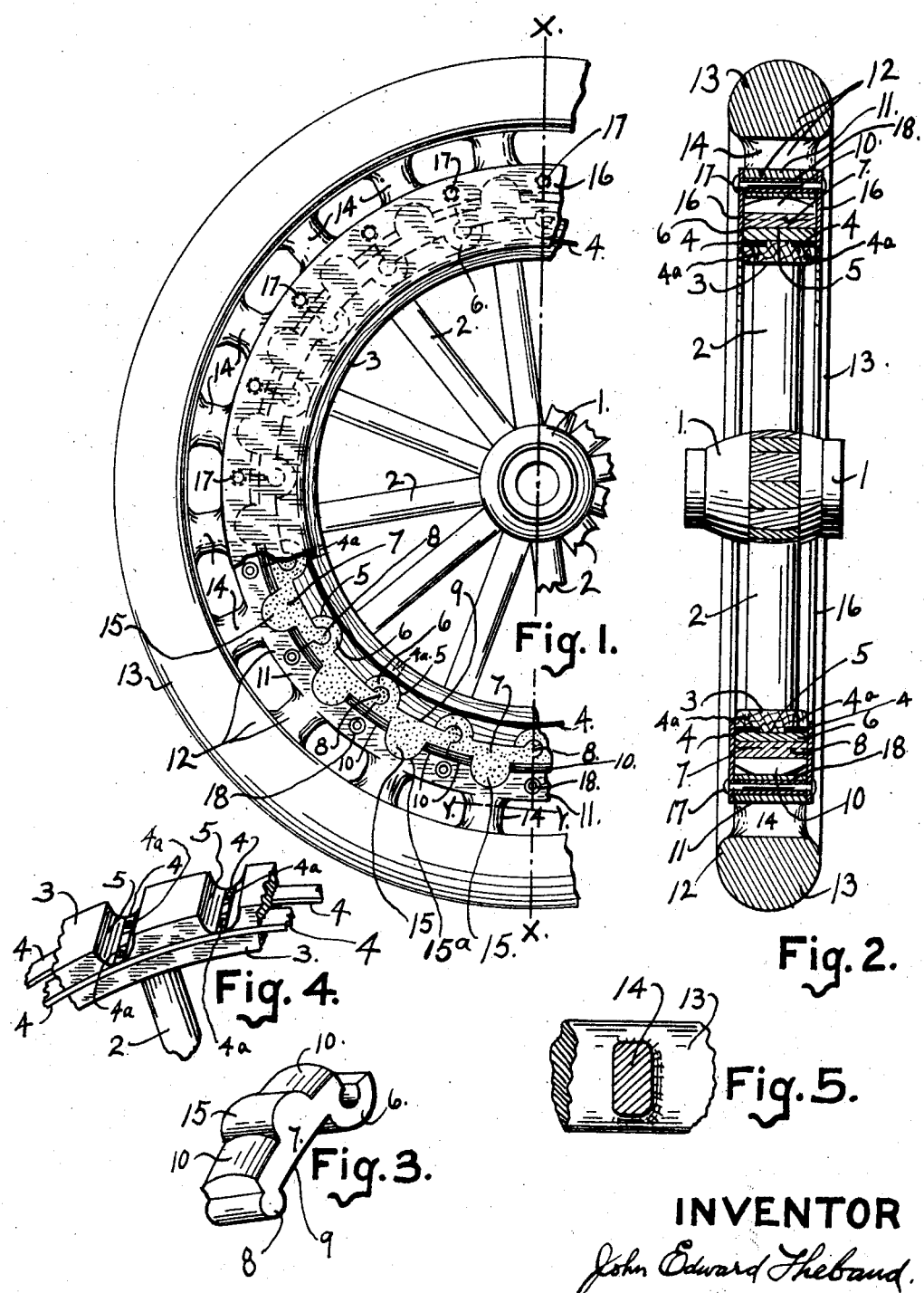

JOHN EDWARD THEBAUD, OF BUFFALO, NEW YORK, ASSIGNOR TO S. JOHNSTONE AND COMPANY, INC., OF BUFFALO, NEW YORK, A CORPORATION OF NEW YORK.

CUSHIONED VEHICLE-WHEEL.

1,391,024.   Specification of Letters Patent.   Patented Sept. 20, 1921.

Application filed July 5, 1919. Serial No. 308,746.

*To all whom it may concern:*

Be it known that I, JOHN EDWARD THEBAUD, a citizen of the United States, residing at Buffalo, in the county of Erie and State of New York, have invented certain new and useful Improvements in Cushioned Vehicle-Wheels; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to cushioned vehicle wheels.

One of the objects of this invention is to provide a vehicle wheel having between its tire portion and the wheel body, a chain of interlocking cushioning links, which engage both the tire portion and the body of the wheel, circumferentially, having the cushioning chain or band retained laterally by means permitting a free radial movement between the said tire portion and said wheel body.

Another object is to provide a vehicle wheel having a zone of interlocked cushioning links next to the tire portion of the wheel and having these links separable transversely, so that any one can be replaced with another, without taking the whole wheel apart, when making repairs to the cushion chain or band formed by the links.

Another object is to provide in a vehicle wheel, a portion having short flexible spokes next to the tire portion, together with a plurality of cushioning elements in a zone between the plurality of short flexible spokes, and a rigid felly portion of the body of the wheel.

A further object is to provide a wheel structure having a rigid central portion and an outer flexible portion together with circular plates, which serve to keep the wheel parts together, when under a strain of lateral thrust, tending to distort the same.

With these and other objects, my invention consists in certain construction, one embodiment of which is illustrated in the drawings, is hereinafter described, the fabrication of the parts is explained and what I claim is set forth.

In the drawings,

Figure 1 is a side elevation of a portion of a wheel embodying my invention, having parts broken away to illustrate the construction thereof.

Fig. 2 is a radial section, taken on the line X—X of Fig. 1, showing the elevation of the parts from side to side.

Fig. 3 is a perspective view of one of the interlocking elements in the chain of the softer cushioning parts of the wheel.

Fig. 4 is a fragmental perspective of the rigid felly showing the transverse pockets adapted to fit the cushioning elements.

Fig. 5 illustrates a cross section of one of the short flexible spokes.

In the figures there are shown radiating from the rigid hub 1, the rigid spokes 2, terminating and fixed in the rigid felly 3. A metal band 4 is let into the felly 3 on each side thereof. Each band is narrower than half the width of the felly and is held securely in place by screws $4^a$. As shown in Figs. 2 and 4, the felly 3 is provided with a series of equally spaced pockets 5, in which are fitted the hooked portions 6 of the cushioning elements 7, each hook portion 6 is keyed with an interlocking head 8 at the opposite end of an adjoining element 7, the portion 9 of the element 7, lies flat against the periphery of the felly 3, while the portion 10 of the element 7 is rounded as shown in Fig. 3, and lies against a band portion 11 of the outer flexible part 12 of the wheel. Between the band portion 11, and the tire portion 13, of the wheel are short flexible spokes 14, made of the same kind of rubber as the tire portion 13. Each of the cushioning elements 7 has an intermediate hump 15 fitting into a notch $15^a$ in the band portion 11 opposite the inner end of each of the spokes 14. The cushioning elements 7 are made of a softer rubber than the outer portion 12 of the wheel. To secure the flexible and inner rigid parts of the wheel against lateral displacement, there are provided two flat rings 16, one on each side of the wheel, having rivets or bolts 17 passing therethrough, near their outer periphery and also passing through the band portion 11 of the flexible outer part of the wheel. These plates 16, are spaced with short lengths of metal tubing 18 surrounding the rivets or bolts 17, which join the parts rigidly together. This structure permits of any radial or up and down movement between the band portion 11, and the felly 3, as the rings 16 are in sliding engagement with the felly 3. Any circumferential displacement between the outer portion 13 of the wheel and the felly 3 is resisted by the meshing of the chain of cushioning elements 7, with notches in both the felly 3 and the band portion 11, where the portions 6 and 15 of the cushioning elements 7 engage the same respectively. The transversely surfaced and co-fitting formation of the opposite ends of the cushion elements 7, with one another permits of withdrawing any one of these elements individually after removing one of the plates 16, and replacing the said element with a new one, securing the plates 16 together afterward in the relation above described.

When the wheel is assembled as shown in Figs. 1 and 2, the chain of soft rubber cushion links 7 is compressed against the felly 3 as the wheel is supporting a load. At the same time, the soft rounded cushion surface 10, of the link 7, flattens against the comparatively rigid, inner cylindrical surface of the band 11. The interlocked ends of the element 7 are, when in position below the hub 1, held together within the notches to secure the holding together of these parts when the wheel is under torsional stress. The placing of the humps 15 opposite the flat portion 9, of the felly 3, provides a good footing for the cushioning elements where the radial strain is greatest and directly opposite the spokes.

Inasmuch as changes can be made in the one embodiment of my invention herein illustrated and described, without departing from the spirit and scope thereof, I do not wish to be confined to this one embodiment, hence I claim, 1. A vehicle wheel comprising three co-operating portions, each occupying a zone in said wheel concentric with its center, the innermost portion being rigid the outermost portion being flexible and the intermediate portion being more flexible than the outermost portion, said intermediate portion having toothlike parts fitting into corresponding notches in the periphery of the said innermost portion, and also having toothlike portions fitting corresponding notches in the outermost portion, said intermediate portion being made up of a series of linked parts adapting the said parts to be transversely separated or assembled, and means inclosing said intermediate portion and attached to one of the remaining portions whereby any transverse strain on said wheel tending to distort the parts is resisted.

2. A vehicle cushion wheel, comprising a hub, a body portion fixed to said hub concentrically thereto, there being recesses in the periphery of said body portion, a tread portion concentric to said body portion, there being recesses on the inner circular surface of said tread portion, and a rubber cushion ring having lug projections fitting into the said recesses in each of said portions, said ring being made up of interlocking links, and a ring plate on each side of said wheel attached to one of said portions and overlapping both portions in contact with said ring, to retain said portions and said ring against lateral displacement.

3. A vehicle cushion wheel, comprising a hub, a body portion, a tread portion, a cushion ring between said portions, means for fixing said ring with each of said portions circumferentially, and other means for fixing said portions with said ring in lateral arrangement, said ring comprising a series of interlocked links, said links being interlocked circumferentially and in sliding engagement laterally upon the removal of said last mentioned means.

4. A vehicle wheel, comprising a hub, a body portion, a tread portion, a cushion ring between said portions, means fixing said ring with each of said portions circumferentially, other means for fixing said portions with said ring in lateral arrangement, and a plurality of short spokes in said tread portion.

5. A vehicle cushion wheel, comprising a hub, a body portion, a tread portion, a cushion ring between said portions, means fixing said ring with each of said portions circumferentially, and other means next to said ring for fixing the same laterally with said body and tread portions, said ring being made up of a plurality of links, having interengaging ends, said links being formed to have, individually, a volume of material less than that of the respective sections of space occupied between said portions and said last mentioned means.

JOHN EDWARD THEBAUD.